United States Patent [19]

Farag

[11] Patent Number: 5,539,601
[45] Date of Patent: Jul. 23, 1996

[54] APPARATUS AND METHOD FOR THERMAL PROTECTION OF ELECTRIC MOTORS

[75] Inventor: Samir F. Farag, Roswell, Ga.

[73] Assignee: Siemens Energy & Automation, Inc., Alpharetta, Ga.

[21] Appl. No.: 241,815

[22] Filed: May 12, 1994

[51] Int. Cl.$^6$ ........................................... H02H 7/08
[52] U.S. Cl. ................... 361/23; 361/25; 361/31; 361/33
[58] Field of Search .................. 361/23, 25, 33, 361/31

[56] References Cited

U.S. PATENT DOCUMENTS

| | | | |
|---|---|---|---|
| 3,809,960 | 5/1974 | Jossic et al. | |
| 3,845,354 | 10/1974 | Boothman et al. | |
| 4,319,298 | 3/1982 | Davis et al. | 361/24 |
| 4,434,390 | 2/1984 | Elms | 318/473 |
| 4,453,117 | 6/1984 | Elms | 318/778 |
| 4,456,867 | 6/1984 | Mallick, Jr. et al. | |
| 4,467,260 | 8/1984 | Mallick, Jr. et al. | 318/800 |
| 4,647,825 | 3/1987 | Profio et al. | 318/395 |
| 4,743,818 | 5/1988 | Quayle et al. | 318/473 |
| 4,939,437 | 7/1990 | Farag et al. | 318/473 |

OTHER PUBLICATIONS

IQ-1000 Motor Protection System User's Manual, Westinghouse Electric Corporation—Control Division, Feb. 1987.
The IQ-2000 Motor Command System: A New Concept in Motor Command, Denis Mueller, Senior Engineer, General Control Division, Westinghouse Electric Corporation, (no date).
Siemens Engineering & Automation, vol. XIII, No. 1, 1991: Digital Motor Protection with New Thermal Replica of the Rotor Circuit, pp. 22–25.
ABB ProStar Motor Protection Relay, pp. 28–33 (no date).

*Primary Examiner*—Todd DeBoer

[57] ABSTRACT

An apparatus for thermal protection of an electric motor is provided, including a monitoring device for generating a signal representative of the current in a conductor supplying electrical power to the electric motor. A control circuit processes the current signal and utilizes the processed signal and motor thermal parameters, including the thermal resistance and thermal capacitance of the rotor, to generate signals representative of the temperature of at least the rotor. A comparator circuit, which may be part of the control circuit, compares the temperature signals to reference maximum temperature signals and produces a control signal when the temperature signals and reference signals satisfy a predetermined relationship. The control signal may be applied to a contactor to interrupt current to the motor. A method for thermal protection of an electric motor is also provided, including thermal modeling of the rotor temperature.

40 Claims, 7 Drawing Sheets

5,539,601

APPARATUS AND METHOD FOR THERMAL PROTECTION OF ELECTRIC MOTORS

BACKGROUND OF THE INVENTION

1. Field of the Invention

The present invention relates generally to the thermal protection of electric motors and, more particularly, to thermal protection through thermal modeling of motor heating and cooling, including modeling of rotor thermodynamics.

2. Description of Related Art

One of the primary causes of damage to electric machines generally, and to electric motors in particular is overheating. In the case of electric motors, such overheating typically results from overload or some type of electrical or mechanical failure in the machine, and can permanently destroy the motor or lead to a significant reduction in its useful life. To avoid such damage, a number of methods have been devised or proposed for limiting the temperature of electric motors, or at least for detecting and warning of a conditions likely to lead to overheating, and ultimately to failure of motors.

One such method involves the use of a thermal model for the motor to be protected. An example of this approach to motor thermal protection is disclosed in U.S. Pat. No. 4,939,437 issued on Jul. 3, 1990 to Farag et al., which is hereby incorporated by reference. In the method described in that patent, thermal protection for certain types of motor is provided by thermally modeling the motor as an analogous electrical circuit wherein the thermal resistances and capacitances of the motor stator windings and housing are used to iteratively calculate estimates for the temperatures of the windings and housing. Implementation of the method by means of a digital microcontroller affords real time modeling of motor temperature. Where temperatures near or in excess of rated limits result from the model, appropriate measures can be taken, such as proving an alarm or removing current to the motor.

However, such methods typically do not include rotor thermodynamics in their thermal model. Moreover, due to the variety of failure modes prevalent with different classes of motors, it would be advantageous if such models could simulate rotor heating as well as heating of the stator winding and housing. In particular, the failure modes of various types of motor depend upon the voltage class of the motor, lower voltage motors being generally "stator limited," meaning that failure typically results from overheating of the stator winding, while medium voltage motors are generally "rotor limited" on startup, or in a stalled or locked-rotor condition, and "stator limited" under normal running. Thus, to afford effective protection against overheating, an improved thermal model for medium voltage motors should provide an estimate of the rotor temperature, particularly during those phases of operation in which failure due to rotor overheating is most likely to occur, during startup, stall and locked-rotor conditions.

SUMMARY OF THE INVENTION

In accordance with one aspect of the present invention, there is provided an apparatus for thermal protection of an electric motor including a monitoring device for monitoring the electric current flowing to the motor. The apparatus further includes a processing circuit for producing a signal representative of the current and for estimating the temperature of the rotor based upon the current signal, the thermal resistance of the rotor and the thermal capacitance of the rotor. Coupled to the processing circuit is a comparator circuit for comparing the estimated temperature with a reference maximum temperature. Finally, a switching device is coupled to the comparator circuit for producing a control signal when the estimated temperature and the reference temperature satisfy a predetermined relationship.

In accordance with another aspect of the invention, there is provided a method for thermally modeling an electric motor having a stator, a rotor and a housing. The method comprises the steps of estimating values representative of the thermal resistance and the thermal capacitance of the rotor, producing a signal representative of the electric current flowing to the motor, estimating the temperature of the rotor using the current signal and the estimated thermal resistance and capacitance values, and producing a control signal based upon this estimated temperature.

BRIEF DESCRIPTION OF THE DRAWINGS

The present invention will become more fully understood from the following detailed description, taken in conjunction with the accompanying drawings, wherein like reference numerals refer to like parts, in which.

Figure 1:
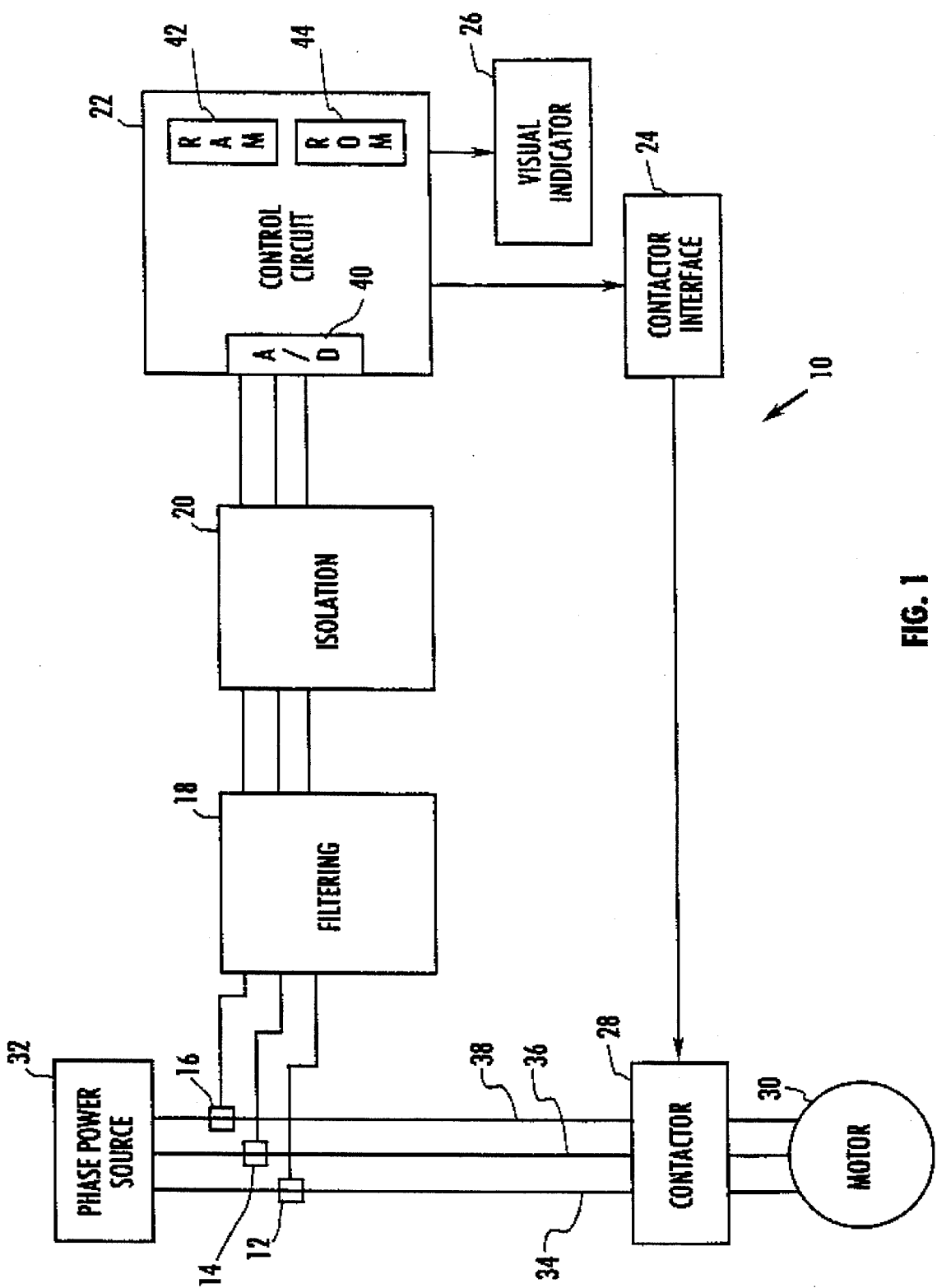
FIG. 1 is a schematic depiction of a typical apparatus in accordance with the invention, shown coupled to the phase conductors of a three phase induction motor.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF THE PREFERRED EMBODIMENTS

Turning now to the drawings and referring to FIG. 1, an apparatus for thermal protection of an electric motor, designated generally by the reference numeral 10, is illustrated schematically including current transformers 12, 14 and 16, a filtering and conditioning circuit 18, an isolation circuit 20, a control circuit 22, a contactor interface 24, a visual indicator 26, and a contactor 28. Also illustrated in FIG. 1 is a 3-phase induction motor 30, and a 3-phase power source 32 which provides 3-phase power to motor 30 via A-phase conductor 34, B-phase conductor 36, C-phase conductor 38, and contactor 28.

In operation, current transformers 12, 14 and 16, which may be transducers, produce signals representative of the phase currents in each of the phase conductors 34, 36 and 38. These currents also represent the phase currents in the stator of motor 30. The signals produced by transformers 12, 14 and 16 are filtered and converted to voltages in an appropriate circuit 18, and applied to an isolation circuit 20, such as a circuit that includes optical isolation. Isolation circuit 20 will be particularly important in applications of the protection apparatus 10 to 3-phase motors operating at relatively high currents, to protect the circuitry of the control circuit 22 against noise and possible damage. Other applications may not require an isolation circuit 20.

The signals from isolation circuit 20, representative of the phase currents in phase conductors 34, 36 and 38 are applied to an analog-to-digital converter 40 which is part of the control circuit 22. Analog-to-digital converter 40 converts the voltage signals received from isolation circuit 20, representative of phase currents in conductors 34, 36 and 38, to digital data representative of these signals. Accordingly, analog-to-digital converter 40 produces real time digital data at a predetermined sampling interval which is representative of the currents in each phase conductor 34, 36 and 38.

In the present embodiment of the apparatus 10, control circuit 22 is a microprocessor (digital processor) that includes analog-to-digital converter 40 as a circuit which is integral to the microprocessor. The microprocessor also includes the appropriate RAM 42 and ROM 44 (e.g. EPROM). The programming that controls the microprocessor is stored in ROM 44. The microprocessor utilizes RAM 42 to store temporarily variable data which is utilized during the execution of the programs stored in ROM 44. In operation, control circuit 28 may include programming that performs various monitoring functions of motor 30 based upon digital values representative of electrical current in conductors 34, 36 and 38, and of certain predetermined parameters relative to motor 30 as will be described. For example, signals representative of electrical current in conductors 34, 36 and 38 may be compared to reference signals representative maximum allowable currents stored in ROM 44 and, if found in excess of those reference values, control circuit 22 may produce an output signal to contactor interface 24 causing contactor 28 to open and remove power to motor 30.

By way of example, contactor interface 24 may include isolation to prevent inductive kickback from contactor 28 to control circuit 22. Such a circuit also includes circuitry able to produce sufficient current to operate the solenoid of contactor 28. Such circuitry for interfacing between current transformers and a 3-phase contactor with a microprocessor based motor control and protection device is described in U.S. Pat. No. 4,939,437 to which reference has been made above. In addition, although the present disclosure specifically covers aspects of the thermal protection apparatus 10 particularly relating to motor modeling, is should be understood that the apparatus may incorporate other components and programs allowing a number of other motor starting and control functions to be performed, such as across-the-line starting, reversing, two-speed and reduced-voltage starting.

In the present embodiment, control circuit 22 is configured to generate a processed current signal representative of the greatest of the root mean square (RMS) current values for the motor phases. In particular, this processed current signal is obtained by determining the RMS value of the digitized current signals for each phase current in conductors 34, 36 and 38 in each of a series of sampling intervals, selecting the greatest of these RMS values for each sampling interval, and averaging the greatest RMS current values over a predetermined number of sampling intervals. The resulting processed current signal I is utilized in subsequent signal processing in the control circuit 22 to obtain signals representative of the temperatures of the rotor, stator and housing, as will be described.

Figure 2:
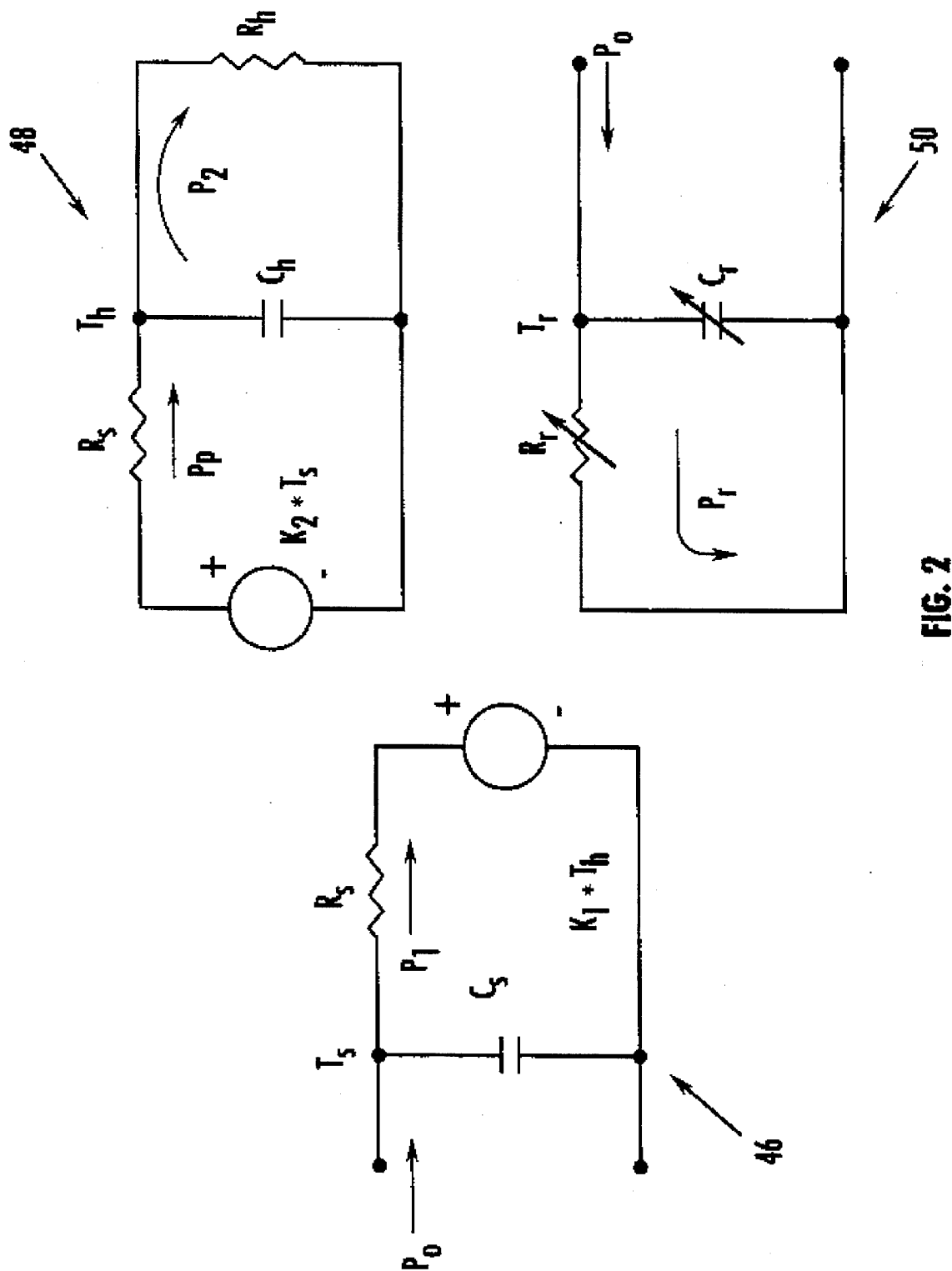
FIG. 2 is a schematic depiction of an electrical circuit analog for the thermal system comprised by an electric motor, which forms the basis for the thermal model used in the invention for thermal protection of an electric motor.

The thermal model utilized in the present embodiment may be represented schematically as the analogous electrical circuit illustrated in FIG. 2. A stator winding thermal circuit 46 includes a stator winding thermal resistance $R_s$, a stator winding thermal capacitance $C_s$ and the analog of a heat source wherein the driving function is represented by the expression $(k_1 * T_h)$, wherein $T_h$ is the housing temperature and $k_1$ is a correction factor. A housing thermal circuit 48 includes the stator winding thermal resistance $R_s$, the housing thermal capacitance $C_h$, the housing thermal resistance $R_h$ and the analog of a heat source wherein the driving function is represented by the expression $(k_2 * T_s)$, wherein $T_s$ is the stator winding temperature and $k_2$ is a correction factor. The rotor thermal circuit 50 includes the rotor thermal resistance $R_r$ and the rotor thermal capacitance $C_r$. In FIG. 2 the rotor thermal resistance $R_r$ and the rotor thermal capacitance $C_r$ are shown as variable quantities. As will be discussed more fully below, the present embodiment utilizes different values for $R_r$ and $C_r$ depending upon the stage of operation of motor 30.

As illustrated in FIG. 2, the stator winding temperature $T_s$, the housing temperature $T_h$ and the rotor temperature $T_r$ are analogous to voltages at the points indicated in the respective circuits. The value $P_o$ is analogous to the current applied to the circuit, and the values $P_1$, $P_p$, $P_2$ and $P_r$ are analogous to the currents at the indicated locations in the respective circuits. The values for the correction factors $k_1$ and $k_2$ are determined to cause the thermal model to produce a control signal, such as a signal causing the contactor 28 to trip, at temperature levels corresponding to overload curves complying to industry standards. The values for the thermal resistances $R_s$ and $R_h$, and for the thermal capacitances $C_s$ and $C_h$ are determined by generally known techniques from empirical motor data (e.g. by monitoring the temperatures and cooling times of the motor stator windings and housing under various conditions).

Figure 3:
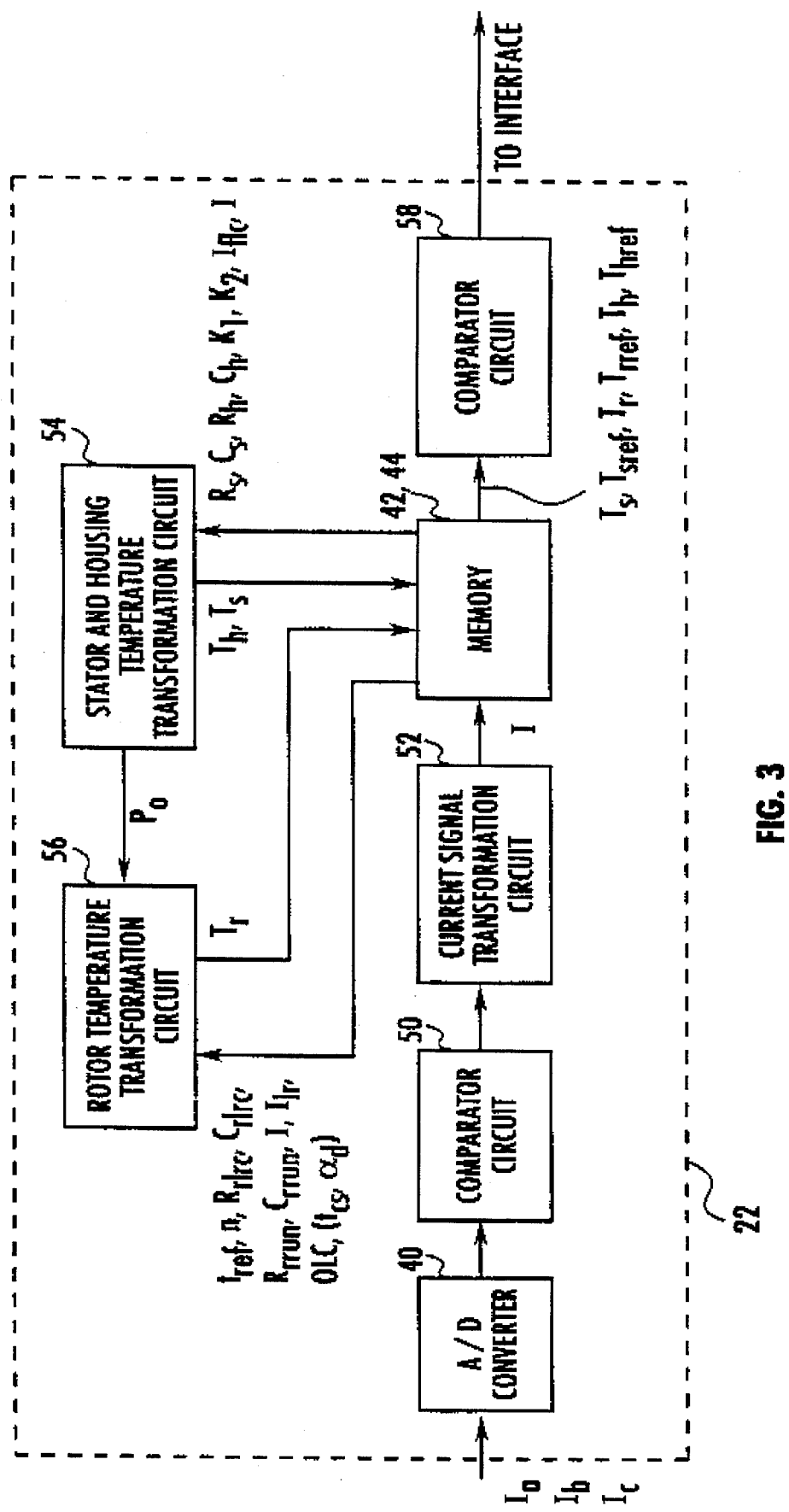
FIG. 3 is a block diagram representation of the control circuit for the apparatus.

As illustrated in FIG. 3, the present embodiment of control circuit 22 includes an analog-to-digital converter 40, a first comparator circuit 50, a current signal transformation circuit 52, memory (including RAM 42 and ROM 44), a stator and housing temperature transformation circuit 54, a rotor temperature transformation circuit 56 and a second comparator circuit 58. FIG. 3 illustrates the flow of the various signals, or digital values, between these parts of control circuit 22. As discussed above, signals $I_a$, $I_b$, $I_c$, representative of the phase currents in conductors 34, 36 and 38, are received at control circuit 22 and converted to digital values by analog-to-digital converter 40. Comparator circuit 50 compares these values and selects the highest among them for each sampling interval. From these sampled current values, current signal transformation circuit 52 generates a processed current signal I, which is stored in memory 42, 44. This value I is in turn applied, along with other values stored in the memory, to transformation circuits, including stator and housing temperature transformation circuit 54 and rotor temperature transformation circuit 56. As will be discussed below, these circuits are configured to generate signals $T_h$, $T_s$, $T_r$ representative of the temperatures of the motor housing, stator winding and rotor respectively. The stator winding, housing and rotor temperature signals are stored in memory and applied, along with reference temperatures $T_{sref}$, $T_{href}$ and $T_{ref}$ for the stator winding, housing and rotor respectively, to comparator circuit 58. When the temperature signals and the reference temperature signals satisfy a predetermined relationship (e.g. the reference temperature is exceeded by the estimated temperature), comparator circuit 58 is configured to generate a control signal.

In the present embodiment the values for the thermal resistance $R_r$ and the thermal capacitance $C_r$ of the rotor may be determined by two alternative methods. Both of these methods rely upon the relationship between the thermal resistance $R_r$, the thermal capacitance $C_r$ and the thermal time constant $\tau$ of the rotor, expressed as:

$$\tau = R_r \times C_r \quad (1)$$

Moreover, based upon testing of a large number of induction motors, it has been determined that the rotor thermal time constant $\tau$ for the a particular motor is related to the cold stall time $t_{cs}$. By convention, cold stall time $t_{cs}$ represents the time required for the rotor temperature $T_r$ to reach 300° C. above the ambient temperature (generally assumed to be 40° C.) under stall or locked rotor conditions. The determined relationship between the rotor thermal time constant $\tau$ and the cold stall time $t_{cs}$ may be expressed by the relationship:

$$\tau = \frac{t_{ce} + 0.2}{0.042} \quad (2)$$

The first method for determining $R_r$ and $C_r$ assumes a default value for the cold stall time $t_{cs}$ based upon the type of motor being modeled. At present, these default values are 20 s for totally enclosed fan cooled (TEFC) motors, and 10 s for open drip proof (ODP) motors. These default values for $t_{cs}$ are based upon generally accepted cold stall time values for the types of motor involved, reduced by a safety factor. Other default values could of course be used. TEFC motors are assumed to include totally enclosed fan cooled explosion proof and totally enclosed air-to-air cooled (TEAAC) models. ODP motors include drip proof weather protected (WP-1), weather protected II (WP-2), and totally enclosed water-to-air cooled (TEWAC) models.

The second method for determining $R_r$ and $C_r$ requires that the cold stall time be supplied for the particular motor being modeled. Where manufactures provide such information on the nameplate of the motor, or can supply such information upon request, this method is generally preferable. Where such information is not available, the default values are used. Where the actual cold stall time $t_{cs}$ for motor 30 is used, and time constant $\tau$ is determined in accordance with equation (2), the thermal resistance and capacitance of the rotor, $R_r$ and $C_r$, can be determined as discussed below. Where a locked rotor (or stall, or starting) current $I_{lr}$ of 6 times the full load current $I_{flc}$ is assumed, the resulting values or $R_r$ and $C_r$ used in the present thermal model cause the modeled rotor temperature $T_r$ to reach the level of 300° C. above ambient temperature in exactly the cold stall time.

Although the thermal time constant is considered a physical constant dependant upon physical properties of the rotor, the values for $R_r$ and $C_r$ are different depending upon the phase of operation of the motor. In particular, the thermal resistance of the rotor increases substantially under locked rotor conditions due to the deep bar effect of induced current in the rotor resulting from slippage. This deep bar effect may be expressed as a factor $\alpha_d$, by which the rotor thermal resistance increases due to rotor slip, and may be determined from the relationship:

$$\alpha_d = 0.351\, D \sqrt{\frac{SWR \times f \times SLIP}{R_{hob}}} \quad (3)$$

wherein D is the depth of the rotor bars, SWR is a ratio of the bar width to the slot width (a constant equal to 0.93 for copper and 1.0 for aluminum), f is the line frequency (e.g. 60 Hz), slip is the rotor slip expressed in percent (equal to unity in locked rotor conditions), and $R_{hob}$ is a bar resistivity factor (a constant equal to 1 for copper and 1.8 for aluminum). Thus, for a given rotor of known construction, the value of $\alpha_d$ is a constant. By way of example, for a rotor having embedded bars at a depth of 1.5 inches, and copper windings, the value of $\alpha_d$ will be equal to 4.07 in locked rotor conditions.

In the present embodiment, because the rotor temperature is known to stabilize at a known temperature above ambient in normal running conditions, the value of $R_r$ under running conditions, expressed $R_{rrun}$, is assumed to be constant and proportional to that stable temperature. Thus, for TEFC motors $R_{rrun}$ is assigned the value 50 (TEFC motors stabilizing at 50° C. above ambient) and for ODP motors $R_{rrun}$ is assigned the value 35 (ODP motors stabilizing at 35° C. above ambient). Based upon these values, the values of the $R_r$ for TEFC and ODP motors under locked rotor conditions, expressed $R_{rlrc}$, may be determined from the relationship:

$$R_{rlrc} = \alpha_d R_{rrun} \quad (4)$$

where $\alpha_d$ is the value of the deep bar factor determined by equation (3).

Using these values of $R_{rrun}$ and $R_{rlrc}$, corresponding values of the rotor thermal capacitance $C_r$ under normal running conditions, expressed $C_{rrun}$, and in locked rotor conditions, expressed $C_{rlrc}$, may be determined as follows:

$$C_{rlrc} = \tau / R_{rlrc} \quad (5)$$

$$C_{rrun} = \tau R_{rrun} \quad (6)$$

where $\tau$ is the rotor thermal time constant determined from equation (2). The values thus obtained for $R_{rrun}$, $R_{rlrc}$, $C_{rrun}$ and $C_{rlrc}$ are utilized in the preferred embodiment as will be discussed below.

In the present embodiment, prior to or upon installation of the apparatus 10, certain known parameters related to the motor being modeled are stored in ROM 44 of the control circuit 22. These parameters include the values of the thermal resistances and capacitances of the stator winding and housing, $R_s$, $C_s$, $R_h$ and $C_h$ respectively, the values of the correction factors $k_1$ and $k_2$, reference maximum temperatures for the stator, housing and rotor, $T_{sref}$, $T_{href}$ and $T_{ref}$, the rated full load current $I_{flc}$ and the locked rotor current $I_{lr}$ of motor 30, and the overload class OLC of motor 30. Furthermore, control circuit 22 may be configured to generate values of the thermal resistance and capacitance, $R_{rrun}$, $R_{rlrc}$, $C_{rrun}$ and $C_{rlrc}$, in which case parameters required for determining these values, such as the motor type and the cold stall time (if known), are also stored in ROM 44. Alternatively, the values of the rotor thermal resistance and capacitance may be predetermined by the equations discussed above, and those values stored in ROM 44. In the present embodiment, depending upon whether the rotor thermal parameters are provided in memory or are generated by control circuit 22, either these parameters or the values required for their calculation are applied to rotor temperature transformation circuit 56 from memory 42, 44 as shown in FIG. 3.

In operation, control circuit 22 continuously samples the phase currents in conductors 34, 36 and 38 to generate the processed current signal I. Based upon this processed current signal and upon the values stored in ROM 44, circuits 54 and 56 are configured to generate continuously, signals representative of the stator winding temperature $T_s$, the housing temperature $T_h$, and the rotor temperature $T_r$. The conversions involved in generating these signals are preferably performed iteratively based upon the following relationships:

$$P_{o(n)} = \left(\frac{I_n}{I_{flc}}\right)^2 \tag{7}$$

$$T_{s(n)} = T_{s(n-1)} + [(P_{o(n-1)} - P_{1(n-1)})\Delta t]/c_s \tag{8}$$

$$P_{1(n)} = (T_{s(n)} - k_1 T_{h(n-1)})/R_s \tag{9}$$

$$P_{P(n)} = (k_2 T_{s(n)} - T_{h(n-1)})/R_s \tag{10}$$

$$P_{2(n)} = T_{h(n)}/R_h \tag{11}$$

$$T_{h(n)} = T_{h(n-1)} + [(P_{p(n)} - P_{2(n-1)})\Delta t]/C_h \tag{12}$$

$$T_{r(n)} = T_{r(n-1)} + [(P_{o(n)} - P_{r(n-1)})\Delta t]/C_r \tag{13}$$

$$P_{r(n)} = T_{r(n)}/R_r \tag{14}$$

where $\Delta t$ is the iterative time step, the subscript (n) represents the value of the indicated parameter during the current iterative step, and the subscript (n−1) represents the value of the indicated parameter during the previous iterative step.

Figure 4A:
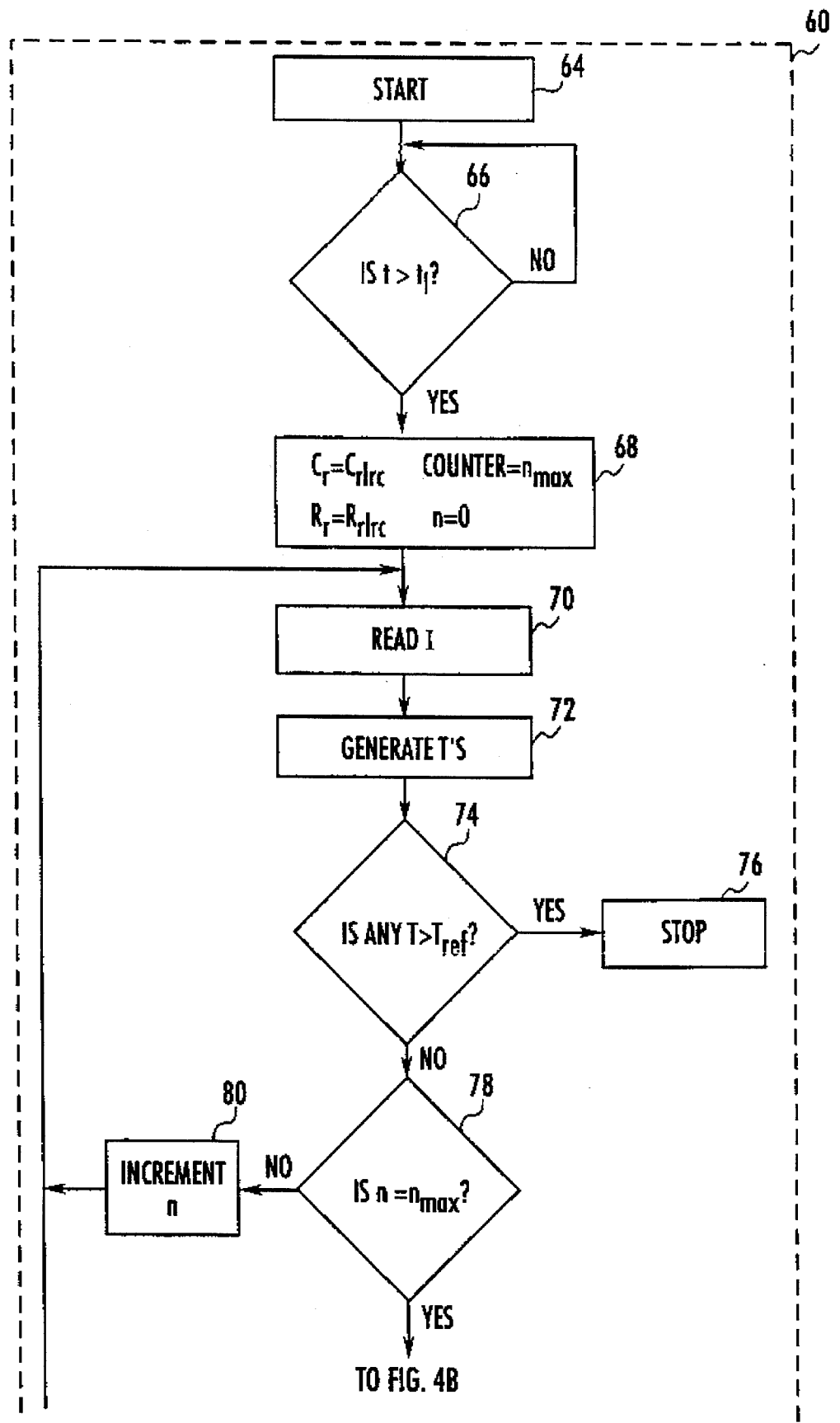
FIGS. 4A and 4B are a block diagram illustrating a typical sequence of steps in control logic implementing the invention.
Figure 4B:
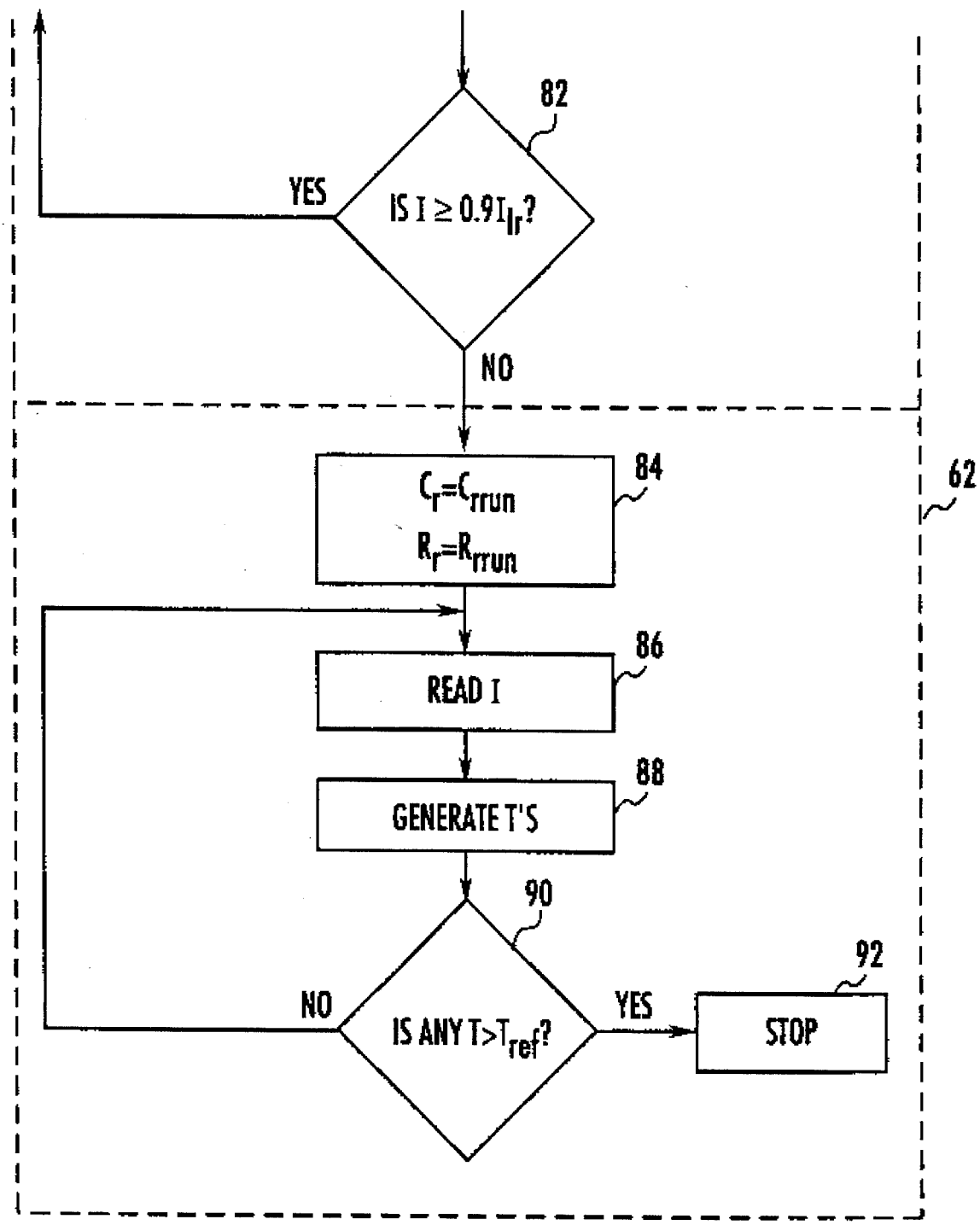

In the present embodiment the foregoing signal processing functions are performed by control circuit 22 as depicted in FIGS. 4A and 4B. These functions may be conveniently illustrated as occurring in a startup sequence 60 and a running sequence 62. The startup sequence 60 begins at block 64 with the starting of motor 30, for example by depressing a start button (not shown). At decision block 66, the time elapsed since the start, t, is compared with a reference time $t_{ref}$, this reference time being stored in ROM 44 and selected to correspond to the time required for the current into motor 30 to decline from the initial inrush current. Only after this initial inrush period may control circuit 22 progress to block 68. At block 68 the values for the rotor thermal resistance and capacitance, $R_r$ and $C_r$, are set to their locked rotor values $R_{rlrc}$ and $C_{rlrc}$ respectively. Where these locked rotor values are not stored in ROM 44, these values may be generated at block 68 as discussed above. Also at block 68, register n is initialized at 0, and a counter register is set at a value representing a maximum number of iterative steps $n_{max}$ corresponding the rated time required for motor 30 to reach running speed. The value assigned to $n_{max}$ is determined from the iterative time step $\Delta t$ and the overload class OLC of motor 30 (stored in ROM 44) according to the following relationship:

$$n_{max} = \frac{(6.9 \times OLC) - 1.8}{\Delta t} \tag{15}$$

At block 70, the processed current value I is read by circuit 54, and at block 72 signals (digital values) representative of the stator temperature $T_s$, housing temperature $T_h$ and rotor temperature $T_r$ are generated from iterative equations (7) through (14) by circuits 54 and 56. The stator, housing and rotor temperature signals are compared with reference maximum temperatures signals $T_{sref}$, $T_{href}$ and $T_{rref}$ (values stored in ROM 44) at block 74 and, if either of the temperature signals exceeds the corresponding reference temperature signal, comparator circuit 58 generates a control signal to stop motor 30, as indicated at block 76, such as by applying the control signal to contactor interface 24 to open contactor 28. The control signal resulting from the comparison at block 74 may also be applied to a visual indicator 26, such as an LED display, to provide a warning that a thermal overload is occurring. If none of the temperature signals exceeds the respective reference temperature signal, the control circuit 22 proceeds to block 78, at which the value of register n is compared to $n_{max}$. If n is less than $n_{max}$, n is incremented by 1 at block 80 and control circuit 22 cycles back to block 70. When n becomes equal to $n_{max}$, control circuit 22 proceeds to block 82 at which the value of I is compared to a value equal to 0.9 times the locked rotor current $I_{lr}$ (stored in ROM 44). If the value of I is equal to or greater than 0.9 times $I_{lr}$ the control circuit returns to block 70. Block 82 causes the control circuit 22 to remain in the startup sequence 60, with $R_r$ and $C_r$ equal to their locked rotor values, until the current drops below 0.9 times $I_{lr}$, indicating that the motor is effectively running. When this condition is met, control circuit 22 enters into running sequence 62.

In the running sequence 62, $R_r$ and $C_r$ are set at their respective running values $R_{rrun}$ and $C_{rrun}$ at block 84. The latter values are either stored in ROM 44 or are generated by control circuit 22 as discussed above. At block 86, the value of I is read and at block 88 signals representative of stator temperature $T_s$, housing temperature $T_h$, and rotor temperature $T_r$ are generated by use of iterative equations (7) through (14) as before. At block 90 the stator, housing and rotor temperature signals are compared to the reference temperature signals in comparator circuit 58 and, as in the startup sequence, when one of these temperature signals exceeds the corresponding reference maximum temperature signal, a control signal is produced by control circuit 22 to interrupt current to motor 30 as indicated at block 92, such as by applying the control signal to contactor interface 24 to open contactor 28. Also as in the startup sequence, a control signal may be produced at block 90 and applied to a visual indicator 26. As long as none of the temperature signals exceeds the corresponding reference maximum temperature signal, control circuit 22 cycles through blocks 86, 88 and 90 during running of motor 30.

In the present embodiment, control circuit 22 is configured to continue the iterative generation of temperature signals whether motor 30 is running or stopped. When motor 30 is stopped, the values of $R_r$ and $C_r$ utilized in the iterative processing are the running values. This continued modeling by control circuit 22 enables temperature signals to be generated that effectively trace the cooling of the stator, housing and rotor while motor 30 is stopped. In this way, continuous estimates of these temperatures may be obtained. This is particularly helpful in modeling temperatures in cases where motor 30 is repetitively started and stopped, as such situations may lead to overheating, particularly of the rotor.

Figure 5:
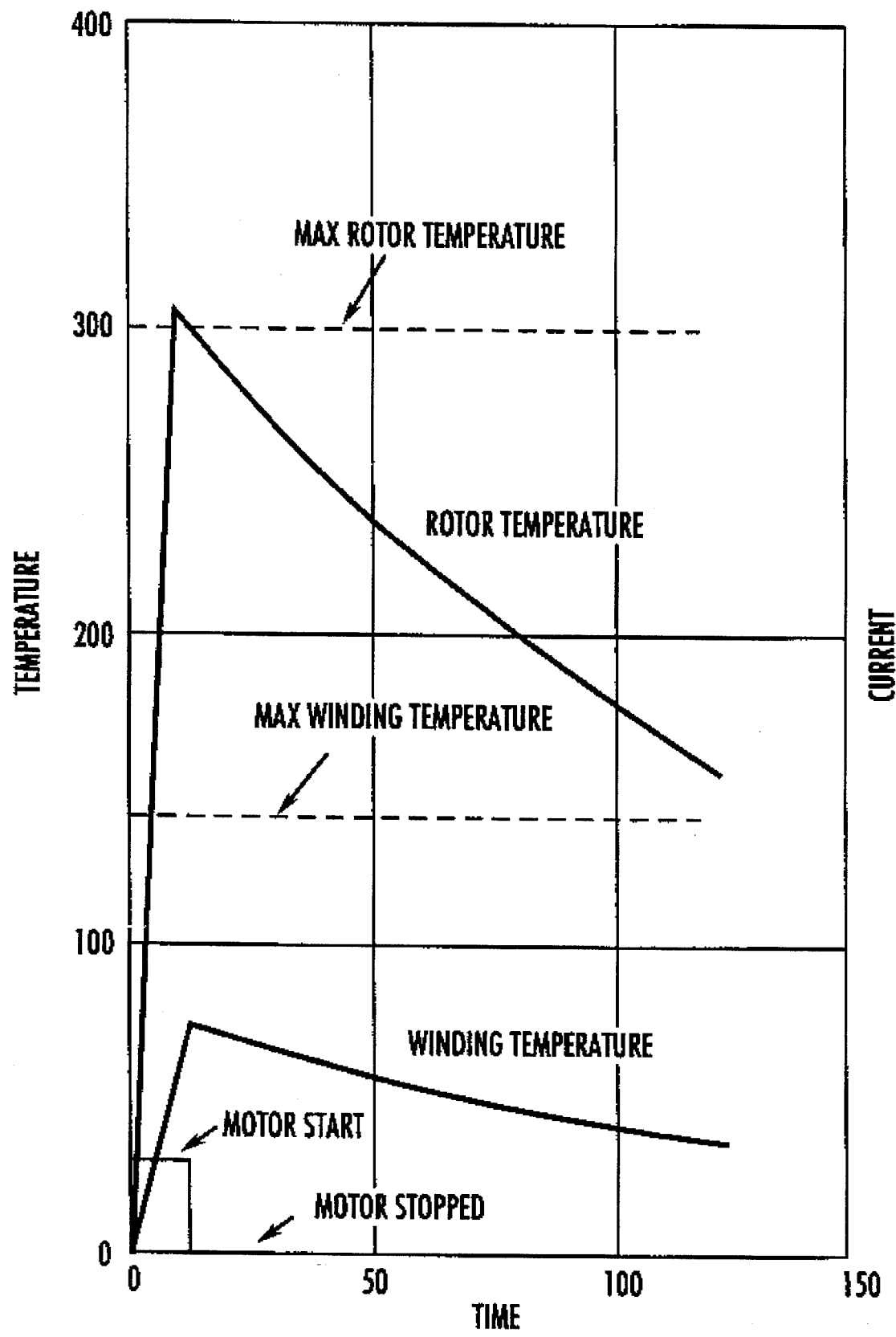
FIG. 5 is a graphical representation of typical stator and rotor temperatures versus time for a motor start in which the maximum allowable rotor temperature is exceeded.

By way of example, FIG. 5 graphically illustrates rotor and stator temperature changes during startup of a motor as modeled in accordance with the present embodiment. In FIG. 5, the motor is started but stalls for 10 seconds before the rotor temperature rises to level in excess of the maximum allowable temperature. At this point current to the motor is interrupted and both the rotor temperature and the stator temperature decline to within the acceptable ranges.

Figure 6:
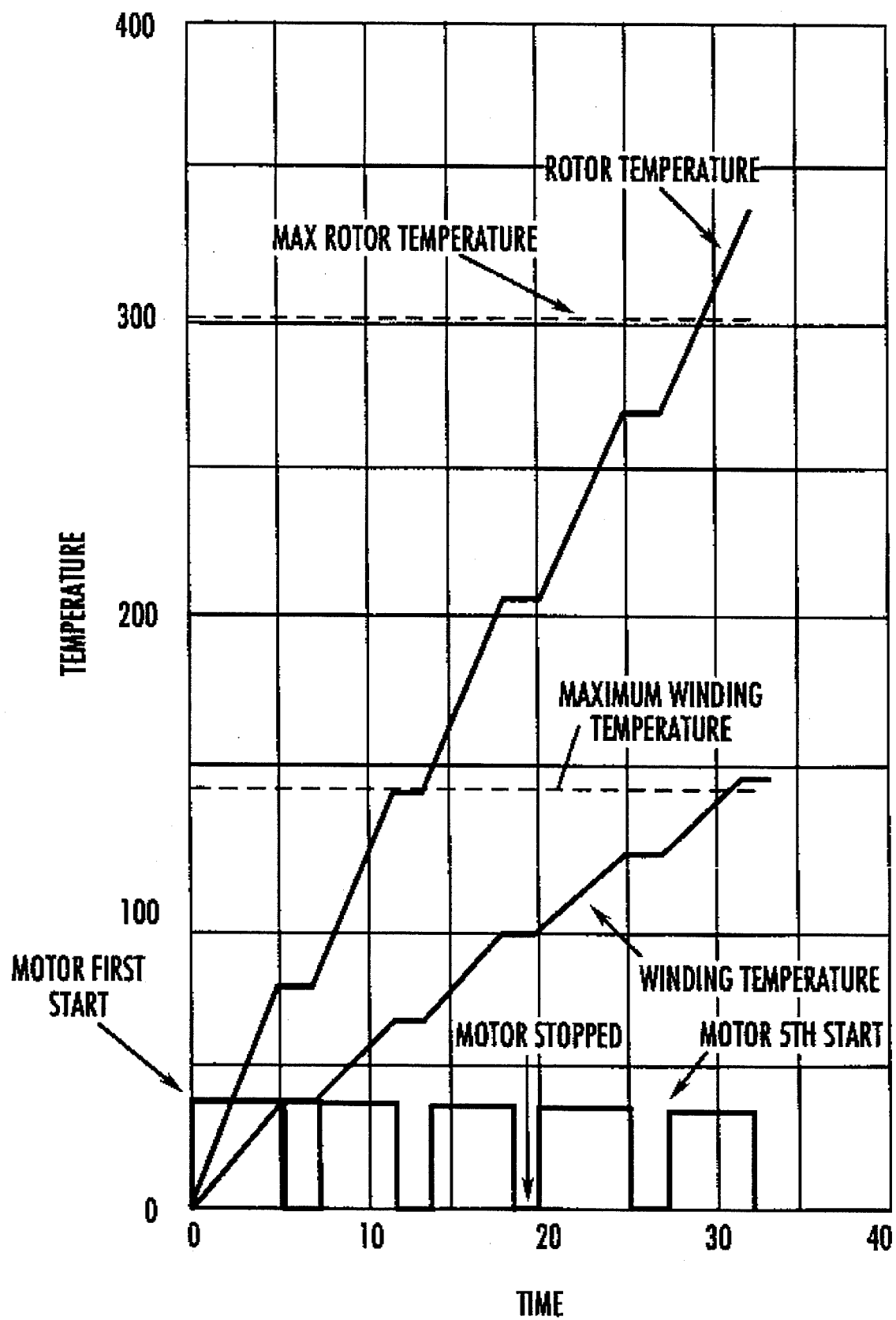
FIG. 6 is a similar graphical representation illustrating excessive rotor temperatures due to multiple successive starts.

FIG. 6 illustrates a different scenario, in which a motor is repeatedly started and stopped. Because control circuit 22 generates temperature signals continuously, including during periods in which the motor is stopped, successive temperature rises due to successive starts are effectively modeled. As shown in FIG. 6, such successive starting can result in overheating of the rotor and/or stator. In the present embodiment, once a maximum allowable temperature of either the rotor or stator has been exceeded, subsequent starting can occur only after both temperatures have declined to within acceptable bounds.

While the foregoing discussion of the present invention has dealt particularly with the thermal model and its implementation, it should be understood that the thermal protection apparatus 10 may be configured to carry out various other functions without departing from the scope of the invention. In particular, various input and output devices could be used in conjunction with control circuit 22 to provide access to signals generated by control circuit 22 for informational or diagnostic purposes. Moreover, while in the present embodiment control circuit 22 is included in a digital processor, various analog devices, or hybrid analog/digital arrangements might become apparent to those skilled in the art for implementing the thermal protection discussed herein. By way of further modification, apparatus 10 may be configured to control and protect single-phase motors.

I claim:

1. An apparatus for thermal protection of an electric motor coupled to at least one electrical conductor, the motor having a rotor of predetermined thermal resistance and thermal capacitance, the apparatus comprising:

a monitoring device coupled to the electrical conductor to produce a current signal representative of the electrical current in the conductor;

a processing circuit coupled to the monitoring device and configured to estimate the temperature of the rotor based upon the current signal, the thermal resistance and the thermal capacitance of the rotor, and the phase of operation of the motor;

a comparator circuit coupled to the processing circuit for comparing the estimated rotor temperature to a reference rotor temperature; and a switching device coupled to the comparator circuit for producing a control signal when the comparison of the estimated rotor temperature and the reference rotor temperature satisfies a predetermined condition, wherein the processing circuit is configured to estimate the rotor temperature based upon first thermal resistance and thermal capacitance values during a startup phase of operation of the motor, and to estimate the rotor temperature based upon second thermal resistance and capacitance values during a running phase of operation of the motor.

2. The apparatus as set forth in claim 1, wherein the processing circuit and the comparator circuit are included in a programmed digital processor.

3. The apparatus as set forth in claim 1, further comprising a memory device coupled to the processing circuit for storing at least the first and second thermal resistance and thermal capacitance values.

4. A method for thermal protection of an electric motor coupled to at least one electrical conductor for supplying electrical energy from a source, the motor having a rotor of predetermined thermal resistance and thermal capacitance, the method comprising the steps of:

determining the operating status of the motor;

monitoring the current in the conductor and producing a current signal representative of the current;

estimating the temperature of the rotor based upon the current signal, the thermal resistance of the rotor and the thermal capacitance of the rotor, the thermal resistance and capacitance of the rotor being valued responsive to the determined operational status of the motor;

comparing the estimated temperature to a reference temperature; and producing a control signal when the comparison of the estimated temperature and the reference temperature satisfies a predetermined condition.

5. An apparatus for thermal protection of a three phase electric motor coupled to three phase conductors, the electric motor having a rotor of predetermined thermal resistance and thermal capacitance, the apparatus comprising:

a monitoring device coupled to each of the phase conductors to produce current signals representative of the electrical current in the conductors;

a processing circuit coupled to the monitoring device and configured to estimate the temperature of the rotor based upon the current signals, the state of operation of the motor, and first and second stored values for the thermal resistance and the thermal capacitance of the rotor corresponding to the state of operation of the motor;

a comparator circuit coupled to the processing circuit for comparing the estimated rotor temperature to a reference rotor temperature; and a switching device coupled to the comparator circuit for producing a control signal when the estimated rotor temperature and the reference rotor temperature satisfy a predetermined condition.

6. The apparatus as set forth in claim 5, wherein the motor is a totally enclosed fan cooled motor.

7. The apparatus as set forth in claim 5, wherein the motor is a drip-proof motor.

8. The apparatus as set forth in claim 5, wherein the monitoring device is a current transformer configured for coupling to each of the phase conductors.

9. The apparatus as set forth in claim 5, wherein the processing circuit and the comparator circuit are included in a programmed digital processor.

10. The apparatus as set forth in claim 5, wherein the processing circuit is configured to estimate the rotor temperature based upon first values for the rotor thermal resistance and thermal capacitance during a startup phase of operation of the motor, and to estimate the rotor temperature based upon second values for the rotor thermal resistance and capacitance during a running phase of operation of the motor.

11. The apparatus as set forth in claim 5, further comprising a memory device coupled to the processing circuit for storing at least said first and second values for the rotor thermal resistance and thermal capacitance.

12. The apparatus as set forth in claim 5, further comprising an indicator responsive to the control signal.

13. The apparatus as set forth in claim 12, wherein the indicator is a light emitting diode.

14. The apparatus as set forth in claim 5, wherein the phase conductors are coupled to a contactor for interrupting current to the motor, and wherein the apparatus further comprises an interface circuit coupled to the comparator circuit and to the contactor, and responsive to the control signal to cause interruption of current to the motor when the predetermined condition is satisfied.

15. An apparatus for thermal protection of a three phase electric motor coupled to three phase conductors., the electric motor having a rotor, a stator and a housing, the rotor, stator and housing each having a predetermined thermal resistance and a predetermined thermal capacitance, a monitoring device being coupled to the phase conductors for producing phase current signals representative of electrical current in the phase conductors, the apparatus comprising:

a processing circuit configured for coupling to the monitoring device and configured to process the phase current signals to generate a processed current signal and for producing at least a rotor temperature signal representative of the temperature of the rotor based upon the processed current signal and the thermal resistance and the thermal capacitance of the rotor, the stator and the housing;

a comparator circuit coupled to the processing circuit and configured to compare the rotor temperature signal to a reference rotor temperature signal; and a switching device coupled to the comparator circuit and configured to produce a control signal when the comparison of the rotor temperature signal and the reference rotor temperature signal satisfies a predetermined condition; and wherein the processing circuit produces a current signal I representative of the current in the conductors, and wherein the processing circuit is a programmed digital processor configured to convert I to a signal representative of the temperature of the rotor in accordance with the following relationships:

$$P_{o(n)} = \left( \frac{I_n}{I_{flc}} \right)^2,$$

$$T_{s(n)} = T_{s(n-1)} + [(P_{o(n-1)} - P_{1(n-1)}) \Delta t]/c_s,$$

$$P_{1(n)} = (T_{s(n)} - k_1 T_{h(n-1)})/R_s,$$

$$P_{p(n)} = (k_2 T_{s(n)} - T_{h(n-1)})/R_s,$$

$$P_{2(n)} = T_{h(n)}/R_h,$$

$$T_{h(n)} = T_{h(n-1)} + [(P_{p(n)} - P_{2(n-1)}) \Delta t]/C_h,$$

$$T_{r(n)} = T_{r(n-1)} + [(P_{o(n)} - P_{r(n-1)}) \Delta t]/C_r,$$

$$P_{r(n)} = T_{r(n)}/R_r,$$

wherein $T_{flo}$ is the rated full load current of the motor, $T_s$ is the stator temperature, $T_h$ is the housing temperature, $T_r$ is the rotor temperature, $R_s$ is the thermal resistance of the stator, $C_s$ is the thermal capacitance of the stator, $R_h$ is the thermal resistance of the housing, $C_h$ is the thermal capacitance of the housing, $R_r$ is the thermal resistance of the rotor, $C_r$ is the thermal capacitance of the rotor, $\Delta t$ is the iterative time step, the subscript (n) indicates the value of the indicated parameter during the current iterative time step and the subscript (n-1) indicates the value of the indicated parameter during the preceding iterative step.

16. The apparatus as set forth in claim 15, wherein the processing circuit is further configured to produce a stator temperature signal representative of the temperature of the stator.

17. The apparatus as set forth in claim 16, wherein the comparator circuit is further configured to compare the stator temperature signal to a reference stator temperature signal, and wherein the switching device is further configured to produce a control signal when the stator temperature signal and the reference stator temperature signal satisfy a predetermined condition.

18. The apparatus as set forth in claim 15, wherein the processing circuit is further configured to produce a housing temperature signal representative of the temperature of the housing.

19. The apparatus as set forth in claim 15, wherein the current signal I represents the average RMS current in the phase conductors over a predetermined number of processing intervals.

20. The apparatus as set forth in claim 15, wherein the processed current signal is the average RMS current in the phase conductors over a predetermined time period.

21. The apparatus as set forth in claim 20, wherein the processing circuit is further configured to compare the phase current signals over predetermined sampling intervals, to select one of the phase current signals having the highest magnitude for each sampling interval, and to generate the processed current signal for the predetermined time period from selected phase current signals.

22. An apparatus for thermal protection of a three phase electric motor coupled to three phase conductors, the electric motor having a rotor, a stator and a housing, the motor having a predetermined cold stall time and the stator and housing each having a predetermined thermal resistance and a predetermined thermal capacitance, a monitoring device being coupled to the phase conductors for producing phase current signals representative of electrical current in the phase conductors, the apparatus comprising:

a processing circuit configured for coupling to the monitoring device and configured to employ first and second rotor thermal resistance signals and first and second rotor thermal capacitance signals representative of the thermal resistance and the thermal capacitance of the rotor during motor starting and motor running operations respectively, and the processing circuit being further configured to process the phase current signals to produce at least a rotor temperature signal representative of the temperature of the rotor based upon the processed current signal, selected rotor thermal resistance and thermal capacitance signals, and the thermal resistance and the thermal capacitance of the stator and housing;

a comparator circuit coupled to the processing circuit and configured to compare the rotor temperature signal to a reference rotor temperature signal; and a switching device coupled to the comparator circuit and configured to produce a control signal when the rotor temperature signal and the reference rotor temperature signal satisfy a predetermined condition.

23. The apparatus as set forth in claim 22, wherein the processing circuit is configured to determine the rotor thermal time constant based upon the cold stall time and to derive the rotor thermal resistance signal and the rotor thermal capacitance signal from the rotor thermal time constant.

24. An apparatus for thermal protection of a three phase electric motor coupled to three phase conductors, the motor having a rotor of predetermined thermal resistance and thermal capacitance, the apparatus comprising:

means for differentiating between motor starting and running conditions;

means for detecting the phase current in the electrical conductors;

means for generating a current signal proportional to the phase currents;

means for generating a rotor temperature signal representative of the temperature of the rotor based upon the current signal, the operating condition of the motor, and values of the rotor thermal resistance and the rotor thermal capacitance selected in accordance with the motor operating conditions; and means for producing a control signal when the rotor temperature signal exceeds a predetermined limit.

25. The apparatus as set forth in claim 24, wherein the motor includes a stator and a housing each of predetermined thermal resistance and thermal capacitance, and wherein the means for generating the rotor temperature signal includes means for generating signals representative of the temperature of the stator and the housing based upon the current signal and the predetermined thermal resistance and thermal capacitance of the rotor, stator and housing.

26. The apparatus as set forth in claim 24, wherein at least the means for generating a rotor temperature signal is included in a programmed digital processor.

27. The apparatus as set forth in claim 24, further comprising means coupled to the phase conductors and responsive to the control signal for interrupting current to the motor.

28. The apparatus as set forth in claim 27, further comprising interface means coupled between the means for interrupting current and the means for producing the control signal.

29. The apparatus as set forth in claim 24, further comprising indicator means responsive to the control signal for producing a visual alarm.

30. A method for thermal protection of a three phase electric motor coupled to three phase conductors, the motor including a rotor having a first predetermined thermal resistance and thermal capacitance during a startup phase of operation and a second predetermined thermal resistance and thermal capacitance during a running phase of operation, the method comprising the steps of:

monitoring the phase currents in the conductors and producing a current signal representative of the currents;

estimating the temperature of the rotor based upon the current signal and the first predetermined thermal resistance and thermal capacitance during a startup phase of operation of the motor, and upon the current signal and the second predetermined thermal resistance and thermal capacitance during a running phase of operation of the motor;

comparing the estimated rotor temperature to a reference temperature; and generating a control signal when the comparison of the estimated rotor temperature and the reference temperature satisfies a predetermined condition.

31. The method as set forth in claim 30, comprising the further step of interrupting current to the motor in response to the control signal.

32. A method for thermal protection of a three phase electric motor coupled to three phase conductors, the motor including a rotor, a stator and a housing and having a predetermined cold stall time, the method comprising the steps of:

determining the thermal time constant of the rotor from the motor cold stall time;

determining, based upon the thermal time constant, first values representative of the thermal resistance and thermal capacitance of the rotor in locked rotor condition, and second values representative of the thermal resistance and thermal capacitance of the rotor in running condition;

monitoring the phase currents in the conductors and producing a current signal representative of the currents;

estimating the temperature of the rotor based upon the current signal and the first values for thermal resistance and thermal capacitance during a startup phase of operation of the motor, and upon the current signal and the second values for thermal resistance and thermal capacitance during a running phase of operation of the motor;

comparing the estimated rotor temperature to a reference temperature; and generating a control signal when the comparison of the estimated rotor temperature and the reference temperature satisfies a predetermined condition.

33. The method as set forth in claim 32 comprising the further step of interrupting current to the motor in response to the control signal.

34. A method for thermal protection of a three phase electric motor coupled to three phase conductors, the electric motor having a rotor, a stator and a housing, the rotor, stator and housing each having a predetermined thermal resistance and a predetermined thermal capacitance, the method comprising the steps of:

monitoring the current in the phase conductors;

producing phase current signals representative of the electrical current;

processing the phase current signals to generate a processed current signal;

producing at least a rotor temperature signal representative of the temperature of the rotor based upon the processed current signal and the thermal resistance and the thermal capacitance of the rotor, the stator and the housing;

comparing the rotor temperature signal to a rotor temperature reference signal; and producing a control signal when the comparison of the rotor temperature signal and the rotor temperature reference signal satisfies a predetermined condition;

wherein the processing step produces a current signal I representative of the current in the conductors, and wherein the rotor temperature signal is produced by programmed digital processor means configured to convert I to the rotor temperature signal in accordance with the following relationships:

$$P_{o(n)} = \left(\frac{I_n}{I_{flc}}\right)^2,$$

$$T_{s(n)} = T_{s(n-1)} + [(P_{o(n-1)} - P_{1(n-1)})\Delta t]/c_s,$$

$$P_{1(n)} = (T_{s(n)} - k_1 T_{h(n-1)})/R_s,$$

$$P_{p(n)} = (k_2 T_{s(n)} - T_{h(n-1)})/R_s,$$

$$P_{2(n)} = T_{h(n)}/R_h,$$

$$T_{h(n)} = T_{h(n-1)} + [(P_{p(n)} - P_{2(n-1)})\Delta t]/C_h,$$

$$T_{r(n)} = T_{r(n-1)} + [(P_{o(n)} - P_{r(n-1)})\Delta t]/C_r,$$

$$P_{r(n)} = T_{r(n)}/R_r,$$

wherein $T_{flc}$ is the rated full load current of the motor, $T_s$ is the stator temperature, $T_h$ is the housing temperature, $T_r$ is the rotor temperature, $R_s$ is the thermal resistance of the stator, $C_s$ is the thermal capacitance of the stator, $R_h$ is the thermal resistance of the housing, $C_h$ is the thermal capacitance of the housing, $R_r$ is the thermal resistance of the rotor, $C_r$ is the thermal capacitance of the rotor, $\Delta t$ is the iterative time step, the subscript (n) indicates the value of the indicated parameter during the current iterative time step and the subscript (n−1) indicates the value of the indicated parameter during the preceding iterative step.

35. The method as set forth in claim 34, comprising the further step of producing a stator temperature signal representative of the temperature of the stator.

36. The method as set forth in claim 35, comprising the further step of comparing the stator temperature signal to a stator temperature reference signal, and wherein the control signal is also produced when the stator temperature signal and the stator temperature reference signal satisfy a predetermined condition.

37. The method as set forth in claim 34, further including the step of producing a housing temperature signal representative of the temperature of the housing.

38. The method as set forth in claim 34, wherein the current signal I represents the average RMS current in the phase conductors over a predetermined number of processing intervals.

39. The method as set forth in claim 34, wherein the processed current signal is the average RMS current in the phase conductors over a predetermined time period.

40. The method as set forth in claim 39, wherein the processed current signal is produced by comparing the phase current signals over predetermined sampling intervals, selecting one of the phase current signals having the highest magnitude for each sampling interval, and generating the processed current signal for the predetermined time period from selected phase current signals.

* * * * *